April 2, 1957  F. E. HOWDLE  2,787,363
APPARATUS FOR HANDLING SHEET-LIKE ARTICLES
Filed Nov. 5, 1953
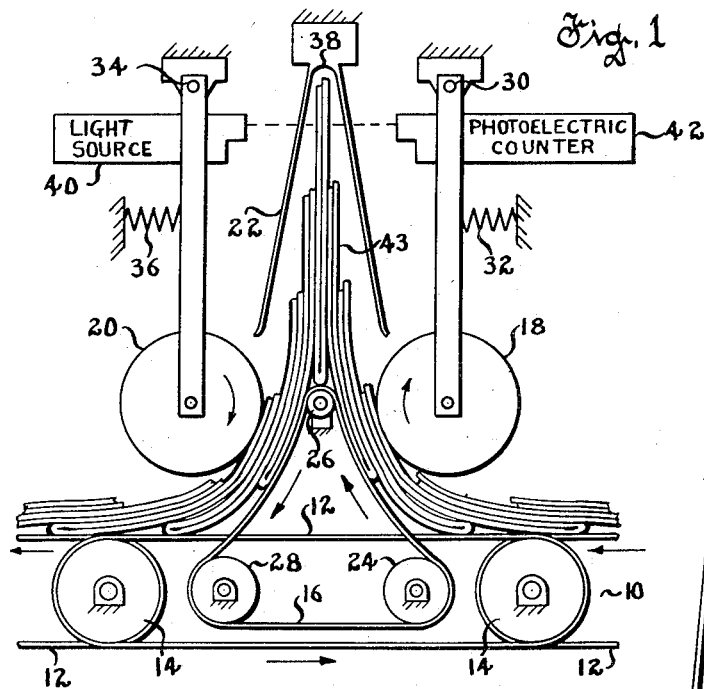
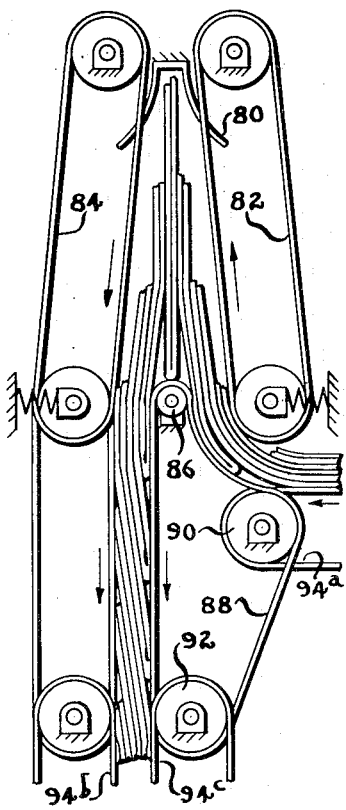
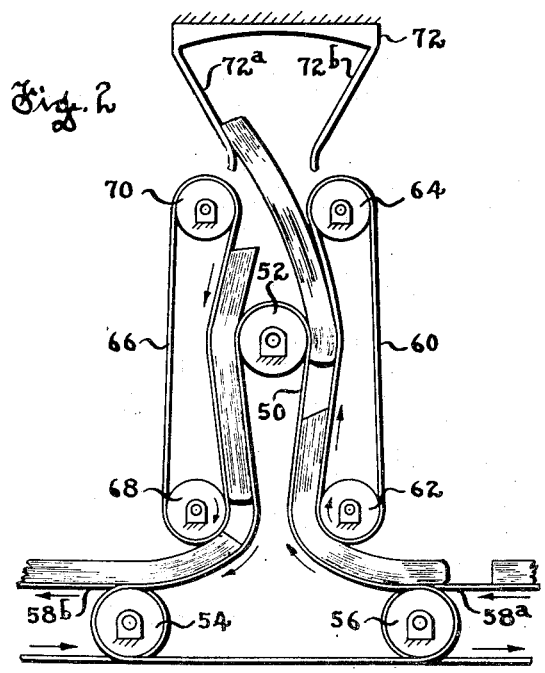
Inventor
Frederick E. Howdle
By W. C. Lyon
Attorney United States Patent Office 2,787,363
Patented Apr. 2, 1957

2,787,363
APPARATUS FOR HANDLING SHEET-LIKE ARTICLES

Frederic E. Howdle, Milwaukee, Wis., assignor to Cutler-Hammer, Inc., Milwaukee, Wis., a corporation of Delaware Application November 5, 1953, Serial No. 390,404

6 Claims. (Cl. 198—33)

This invention relates to apparatus for handling sheet-like articles, and it relates more particularly to means for inverting and counting newspapers and the like.

In handling sheet-like articles it is often important that such articles be arranged with certain edges thereof extending in a given direction. For example, it is often necessary to invert newspapers or magazines after they leave the press so that the cut edge or the folded edge thereof, whichever leads at first, thereafter trails.

An object of this invention is to provide apparatus for inverting articles of the aforedescribed character.

Another object is to provide improved apparatus for inverting each of a succession of articles arranged in overlapping relationship.

Another object is to provide improved apparatus for inverting sheet-like articles and to count the number of articles which are inverted.

Another object is to provide improved apparatus of the aforementioned character which is dependable in operation and inexpensive to manufacture and to maintain.

Another object is to provide improved apparatus of the aforementioned character which may be readily adapted to be powered by an existing conveyor mechanism or by a separate power source.

Various other objects and advantages of the invention will hereinafter appear.

The accompanying drawings illustrate certain embodiments of the invention which will now be described, it being understood that other embodiments are possible and that various modifications may be made in respect of the structural details of the embodiments illustrated without departing from the spirit or scope of the invention as defined in the appended claims.

In the drawings, Figure 1 is a schematic illustration of an inverting and counting unit embodying the invention;

Fig. 2 is a schematic illustration of an alternative form of inverting unit embodying the invention; and Fig. 3 is a schematic illustration of another alternative form of inverting unit embodying the invention.

Referring to Fig. 1 the numeral 10 generally designates suitable conveyor mechanism comprising belting 12 and rollers 14 adapted to carry a succession of sheet-like articles such as newspapers, pamphlets, flexible containers, etc., toward the inverting and counting mechanism from the right, in the drawing, and away therefrom toward the left. The belting 12 preferably comprises a plurality of narrow belts of a well known form arranged in parallel relationship and suitably spaced apart from each other.

The inverter mechanism includes an endless pick-up and delivery belt 16, a compression roller 18, a second compression roller 20 and a stop or abutment means 22. The belt 16 is preferably in the form of a plurality of narrow belts arranged in parallel relationship and suitably spaced apart from each other. It extends over a drive roller 24, a transfer roller 26, and an idler roller 28. The transfer roller 26 is positioned above belting 12 of conveyor 10 and the drive roller 14 and idler roller 28 are positioned below the upper, working side of belt 12. The individual narrow belts which comprise belt 16 are preferably positioned between the successive individual narrow belts which comprise belt 12. The compression roller 18 is suspended from a pivot as at 30, and is biased toward belting 16 and transfer roller 26 in any suitable manner, such as by spring 32. The second compression roller 20 is suspended from a pivot as at 34 and is similarly biased toward belt 16 and transfer roller 26, as by means of spring 36. As will hereinafter be more fully described, it is considered preferable that the respective axes of rotation of rollers 18, 20 and 26 lie substantially in the same horizontal plane.

Stop 22 is preferably shaped somewhat like an inverted V. Its apex 38 is spaced vertically above transfer roller 26 at a distance which is substantially equal to the length of the articles to be inverted. Along its width, near apex 38, stop 22 is provided with cutouts or is otherwise formed to permit the passage therethrough of a light beam, emanating from a light source 40 on one side of stop 22, toward a light-sensitive counter 42 having its pick-up device mounted on the other side of stop 22.

The unit will invert and count individual articles whether they be spaced at regular or irregular intervals or are arranged in succession in overlapped relationship. Such a succession 43 of articles is illustrated in Fig. 1 in overlapping relationship in direct mode of delivery (i. e., with the leading edge of each article lying above the preceding article as they approach the inverter mechanism). The articles are picked up from belt 12 by belt 16 and are carried between belt 16 and compression roller 18. The roller 18 is biased toward and against the articles by means 32 and is free to rotate as an incident to frictional engagement thereof with the articles. The latter are squeezed together to prevent their slipping downwardly. After being carried upward between belt 16 and roller 18, an article emerges from therebetween with its leading portion moving in a substantially vertical direction. Upon striking the apex 38 of stop 22, upward motion of the leading portion of the article is stopped. The trailing end portion of the article is then carried over transfer roller 26 by reason of frictional engagement thereof with belt 16. Thereafter the article is carried downwardly, with its trailing edge leading, between belt 16 and compression roller 20 at a rate determined by the speed of belt 16 and is delivered to belt 12 for movement therewith in overlapped relationship with the other articles of the succession. The articles thence pass to belt 12 in indirect mode of delivery (i. e., with the leading edge, formerly the trailing edge, below the next preceding article).

While it is not essential to successful operation of the unit that it be so oriented that the articles stand vertical at the time the direction of their motion is reversed, so orientating the unit has several advantages. A considerable amount of friction between the engaging sides of successive articles is desired while the articles are moved between rollers 18 and 26 and between rollers 20 and 26 so that relative motion between successive articles will be minimized. However, relative motion is required between that article, which at any given time is stopped while its trailing edge is being transferred across the transfer roller 26, and both the next preceding article (which is moving downwardly) and the next succeeding article (which is moving upwardly). With the respective axes of rollers 18, 26 and 20 lying in approximately the same horizontal plane, this relative motion occurs in a vertical plane. The weight of each of these articles acts vertically downward so that friction between them is minimized and the entire weight of the article having its lower edge transferred across roller 26 by belting 16 is utilized to increase friction between said lower edge and belting 16 whereby the transfer is made with maximum efficiency.

Transfer roller 26 is preferably of relatively small diameter although the diameter is not a critical factor.

Pivotal mounting of compression rollers 18 and 20 and the provision of means to bias said rollers inwardly, enables the unit to handle articles of various thicknesses without alteration of the unit. When used in conjunction with a newspaper conveyor, no adjustment is required to compensate for changes in the thickness of successive issues of the newspaper.

The count obtained by counting the number of times the light beam is interrupted by articles approaching stop 22, is very accurate. Assuming the articles are newspapers arranged in overlapping relationship with each paper leading the successive one three inches, the separation between apex 38 and the point below the apex 38 at which the edges of adjacent papers will coincide is one and one-half inches. This spacing is ample to afford sufficient time intervals between interruptions of the light beam for accurate counting at the highest newspaper conveyor speeds.

It will be apparent that various modifications may be made in the scheme illustrated with respect to the relative sizes of the various rollers, the angles at which the articles are picked up from and delivered to the main conveyor and the arrangement of the idler and drive rollers, to accommodate articles of various sizes and degrees of flexibility and depending upon the space available for the inverter and counter, etc.

One modified form of inverter is shown in Fig. 2. This unit comprises a drive belt 50 extending around a transfer roller 52 and idler rollers 54 and 56 which form part of a main conveyor comprising, in addition, belts 58$^a$ and 58$^b$. The unit further includes a pick-up belt 60 driven on rollers 62 and 64 and a delivery belt 66 driven on rollers 68 and 70 by frictional engagement with the articles to be inverted, and a stop 72 mounted in line with and above transfer roller 52. Rollers 62 and 64 are mounted at fixed points on one side of and respectively below and above roller 52. Rollers 68 and 70 are mounted at fixed points on the other side of and respectively below and above roller 52. Articles to be inverted are delivered to the inverter on belt 58$^a$, are then picked up by belt 50, and moved upwardly and held against slipping by belts 50 and 60; and are then projected up against stop 72 on the side 72$^a$ thereof. The leading edge of the article is held away from belt 66 by side 72$^a$. When the leading edge of the article reaches the top of the stop 72, its trailing edge is carried over the transfer roller 52 by frictional engagement with the roller 52 or belt 50. The upper portion of the article is permitted to flop over against the opposite side 72$^b$ of stop 72, which side 72$^b$ holds said upper portion clear of belt 60. Thereafter the trailing edge portion, now the leading portion, of the article is engaged between belts 50 and 66 and is carried downwardly therebetween without slipping. Then the article emerges from between belts 50 and 66 and is transferred to belt 58$^b$. Belts 50, 60 and 66 are formed of coiled wire or other resilient material which will stretch and contract as required by the thickness and spacing of the articles.

This unit is best suited for inverting articles which are not overlapped although it may be employed to invert a succession of overlapped articles. The stop 72 is well suited for use in inverting even very flexible articles. It will be apparent that pick-up and delivery mechanism such as spring belts 60 and 66 and the rollers respectively associated therewith may be employed in the unit shown in Fig. 1 in lieu of compression rollers 18 and 20. Also a counter similar to the counter employed in the unit shown in Fig. 1 may be used in the units shown in Fig. 2 and Fig. 3.

The unit shown in Fig. 3 illustrates another modification of the invention in which advantage is taken of the change in direction of motion of the articles during the inversion thereof, to change the direction of the main conveyor.

This unit comprises a stop 80, a pick-up belt 82, a delivery belt 84, a transfer roller 86, and a drive belt 88. The latter extends over transfer roller 86 and rollers 90 and 92 of the main conveyor system. The operation of the unit will be apparent from the description of the operation of the units shown in Figs. 1 and 2. Articles are delivered to the inverter unit on main conveyor belt 94$^a$ and are delivered from the conveyor in a downward direction between main conveyor belts 94$^b$ and 94$^c$.

As will be apparent, in certain applications of my invention, as for example when the articles to be inverted are arranged in overlapping relationship and are heavy or are conveyed and inverted at slow speeds, that article being inverted at a given time may be sufficiently supported by the next preceding and the next succeeding article so that a stop member is not required and may be omitted. The stop, if provided in such cases, would act merely as a safety device.

It will also be apparent that while in certain cases it may be preferable to arrange the transfer roller in such a manner that the articles move in almost reverse directions immediately before and after being transferred across the transfer rollers, such arrangement is not essential. In general, opposite directions are to be understood to be directions which differ from one another by more than ninety degrees.

I claim:

1. In a mechanism for inverting individual sheet-like articles of a succession of such articles delivered thereto in overlapping relationship with the leading edge of each article lying above the preceding article and for discharging the succession of articles in overlapping relationship with the leading edge of each article lying below the preceding article, in combination, a first conveyor element comprising an uppermost roller and a belt adapted to run substantially vertically upward to and over said roller and substantially vertically downward therefrom, a second conveyor element adapted to hold ascending articles of the succession against the upwardly running portion of said belt substantially without relative movement between any one article and said belt or the other ascending articles until said one article has passed to a position above said roller, said first conveyor element being adapted to engage the trailing edge of each succeeding article rising thereabove and to carry said trailing edge over said roller, a third conveyor element adapted to hold descending articles of the succession of articles against the downwardly running portion of said belt substantially without relative movement between any one article and the belt or the other descending articles, and a stop positioned above said roller at a distance substantially equal to the length of one of said articles.

2. In an inverter for inverting individual articles in a succession of sheet-like articles delivered thereto in overlapped relationship, in combination, an inner conveyor element comprising an upper roller and a conveyor belt running substantially vertically upward to and over said roller and substantially vertically downward therefrom, and a pair of outer conveyor elements positioned on opposite sides of said inner element and each adapted to run at substantially the speed of said conveyor belt in the direction of movement of its associated side of said belt, means to urge said outer conveyor elements inwardly toward said belt whereby articles of the succession are held between said belt and said outer conveyor elements for movement therewith, said roller having a relatively small diameter whereby an article resting thereon will be held in a substantially vertical position by preceding and succeeding articles then being moved between said belt and said outer conveyor means.

3. The inverter defined in claim 2 in which each of said pair of outer conveyor elements comprises a conveyor belt which extends above and below the axis of rotation of said roller.

4. The combination according to claim 1 together with counting means comprising a light source disposed to project a light beam across the path of articles below the upper limit of said stop a distance less than the normal lap lead between articles and a photo sensitive impulse counter disposed to have said light beam impinge thereon except when articles are moved through and back out of said beam by said belt and said roller.

5. An inverter for newspapers and similar articles for inverting the mode of delivery of a stream of such articles arranged in overlapped relationship, in combination, conveyor means for engaging one side of the stream of overlapped articles and for carrying each article vertically upward along one side of and above said conveyor means and thereafter carrying each article vertically downward along the other side of said conveyor means while engaging the other side of the stream of overlapped articles, a transfer roller at the upper portion of and forming a part of said conveyor means for carrying the trailing ends of successive ones of the articles from said one side to said other side of said conveyor means, each article being held in a vertical position by the leading and trailing ends of adjacent overlapping articles while the trailing end of each such article passes over said transfer roller, and means for forcing the upwardly and downwardly traveling portions of the stream of articles into engagement with said one side and said other side, respectively, of said conveyor means.

6. The combination according to claim 5, in which said conveyor means comprises an endless belt running upwardly to and over said transfer roller and downwardly from the latter.

References Cited in the file of this patent

UNITED STATES PATENTS

| | | |
|---|---|---|
| 1,337,031 | Allatt | Apr. 13, 1920 |
| 1,541,651 | Matlack | June 9, 1925 |
| 2,541,752 | Eddy | Feb. 13, 1951 |
| 2,628,704 | Colvin | Feb. 17, 1953 |